May 14, 1929. R. A. STEPS 1,713,502
BRAKE FOR CENTRIFUGALS
Filed June 23, 1926 5 Sheets-Sheet 3

Inventor
Robert Alexander Steps

May 14, 1929.  R. A. STEPS  1,713,502
BRAKE FOR CENTRIFUGALS
Filed June 23, 1926  5 Sheets-Sheet 5

Inventor
Robert Alexander Steps

Patented May 14, 1929.

1,713,502

UNITED STATES PATENT OFFICE.

ROBERT ALEXANDER STEPS, OF LOS ANGELES, CALIFORNIA.

BRAKE FOR CENTRIFUGALS.

Application filed June 23, 1926. Serial No. 118,110.

In centrifugal machines of various makes, the usual construction comprises a vertical rotatable spindle, oscillatively suspended approximately from its upper end, and having a belt pulley fastened to it near its upper end, and also a centrifugal basket fastened to it near its lower end.

Power is imparted for rotating the spindle by a belt operating on the pulley, and the charge to be centrifuged, such as sugar, salt, textile fabrics, etc., are put into the basket.

A brake for rapidly stopping the centrifugal is also provided, and the usual practice has heretofore been to install this brake on the inside of the pulley.

In sugar factories, where large numbers of centrifugals of the above type are used, the cycle is very fast, sometimes as short as three minutes. That is, the charge to be centrifuged is loaded into the basket at low speed, a large amount of power is applied through the belt for rapidly bringing the spindle and basket to a speed of approximately 1100 R. P. M., the apparatus is allowed to spin at this high speed for a few moments while the charge is being purged, the power is then turned off, and the internal pulley brake is applied for the purpose of bringing the entire apparatus to rest as quickly as possible. The charge is then removed from the basket, a new charge is put in, and the entire above described operation is repeated, the full cycle requiring approximately three minutes, as stated.

The above described apparatus accomplishes its purpose very satisfactorily in all respects, except that considerable difficulty is experienced with the belts. These belts are fairly expensive, and their life is exceedingly short, compared with the life that can ordinarily be expected from such belts used in connection with other kinds of machinery.

Probably the greatest contributing factor to this rapid and excessive deterioration of the centrifugal belts, is the above described internal pulley brake which is common and well known to those experienced in the art. Owing to the construction, location and mode of operation of this brake, it generates great quantities of heat in the pulley rim and raises the temperature of the latter so high that it burns the belts long before they have become otherwise impaired by the normal forces. The cause of this heat is more or less apparent. The basket, charge, and other rotating parts, which weigh well above 1,000 lbs., when spinning at 1100 R. P. M., represent approximately 700,000 ft. lbs. of kinetic energy, and when the brake is applied this total energy is converted into heat as the centrifugal comes to rest. The trouble with the internal pulley brake is that it generates this heat on the inner surface of the pulley rim, and since so much heat is generated there, the temperature of the pulley rim soon rises to a scorching temperature as the result of the severe braking action which occurs repeatedly, once every three minutes. This temperature in the pulley rim is so hurtful to the belts, that it is commonly stated that these centrifugal belts "burn out," instead of "wearing out".

The object of my invention is to provide a simple, powerful, efficient brake for centrifugals of the above described type, which will effectively perform its function without developing the brake heat in the pulley rim, and which therefore greatly increases the life of the centrifugal belts by sparing them from the excessively high temperatures that they are exposed to in structures using the internal pulley brake.

My invention is especially arranged not only for use on new centrifugals, but also is intended for use on present existing centrifugal apparatus from which the present internal pulley brake can be removed and my full floating, external, heat insulated brake installed instead. The ability to install my brake on existing centrifugal installations, is of utmost importance, as it makes it possible to obtain the benefits thereof in connection with the present existing equipment.

My brake is also more durable than the present centrifugal brakes; its brake lining lasts longer before replacement is necessary; all parts are more accessible for adjustment; it stops the centrifugal quicker; and possesses other advantages and benefits that will be apparent to those skilled in the art. Also, certain features of my brake, including particularly the provision for cooling the brake drum, are applicable to centrifugals generally irrespective of whether they are belt driven, electrically driven, or driven in other ways, and also irrespective of whether the brake is an internal or an external brake.

The appended drawings and description illustrate my preferred form of the invention.

Figure 1:
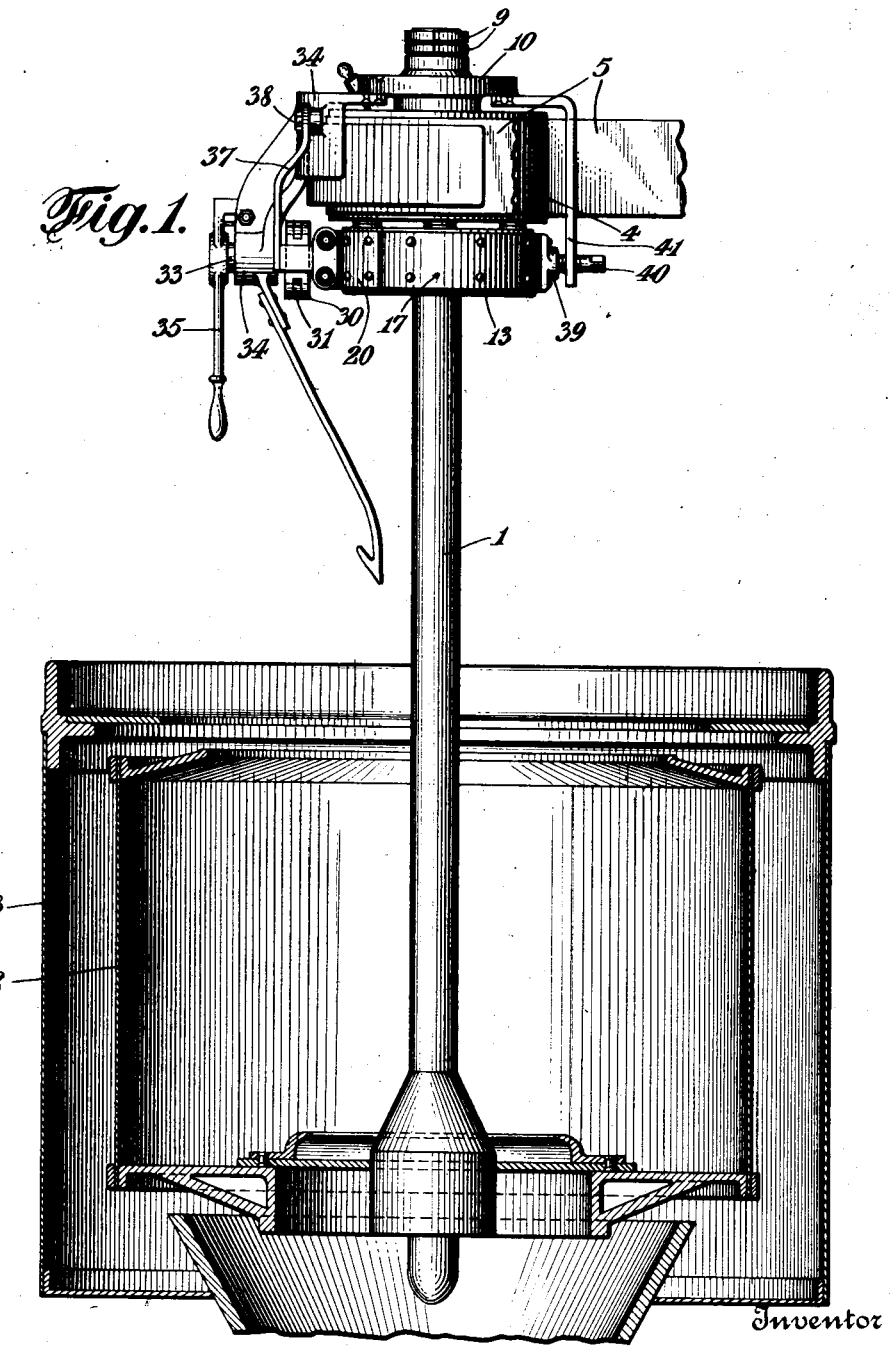
Fig. 1 is an elevation, partly in section, showing the centrifugal apparatus with my brake attached thereto.

Referring to Fig. 1, reference numeral 1 designates the rotatable centrifugal spindle, with the centrifugal basket 2 fastened to its lower end. The curbing 3 surrounds the basket. The pulley 4 is shown near the top of spindle 1, and the driving belt 5 is shown in its relation to pulley 4.

Figure 2:
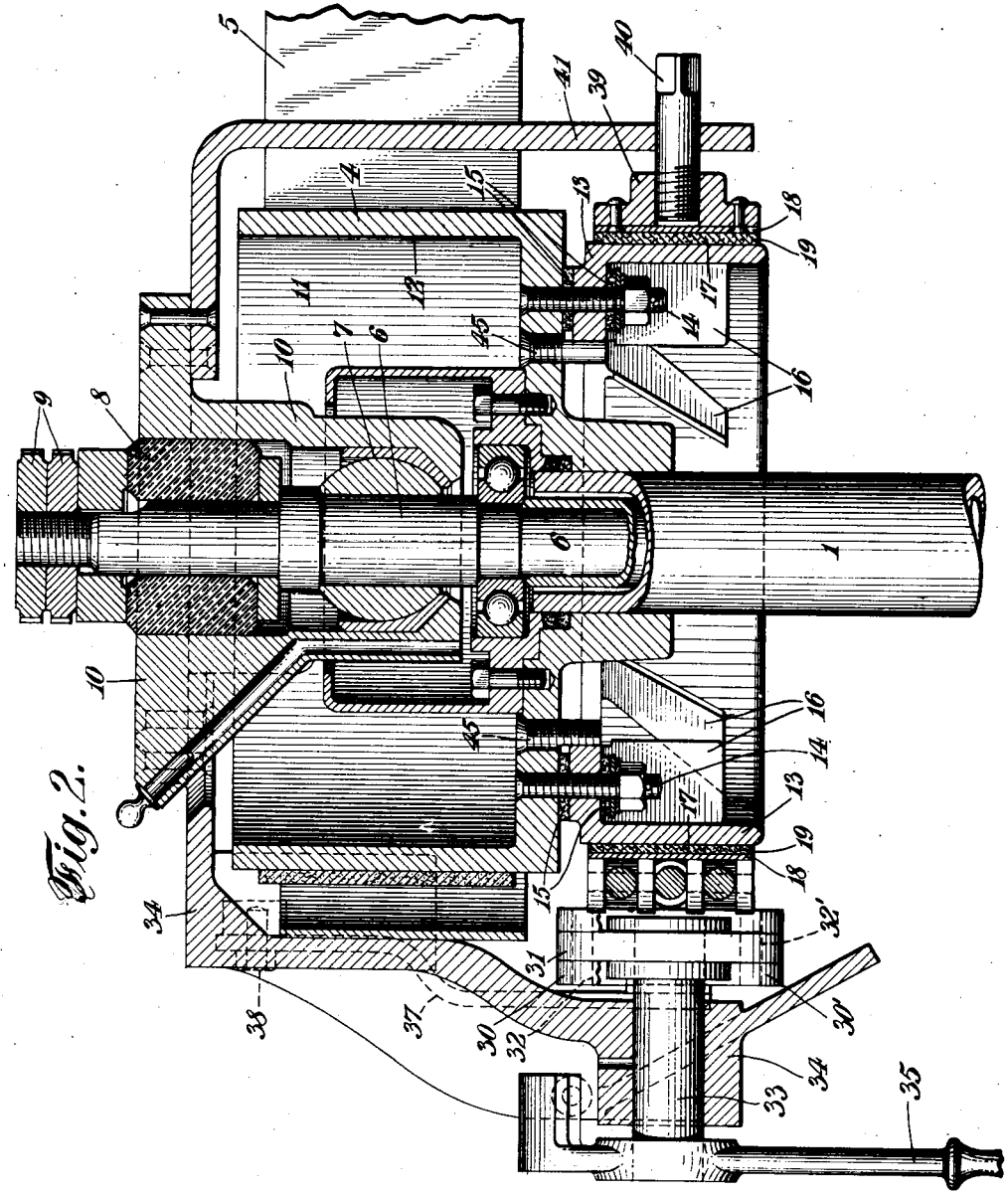
Fig. 2 is a longitudinal section taken vertically through my brake.

The location of my brake with reference to the other parts generally, can also be seen on Fig. 1, but the details of the brake are best illustrated in the other figures, particularly Fig. 2, which also shows some of the well known bearing equipment which supports the rotating spindle 1.

Referring to Fig. 2, it is understood by those acquainted with the art that the revolving spindle 1 is actually carried and supported by an inner non-rotating spindle 6, the latter being allowed to oscillate on a ball seat 7, so that any eccentric or uneven loading of the charge into basket 2 will permit the rotating spindle 1 to rock or oscillate so as to find its own center of gravity with reference to the uneven charge. To steady the spindle against excessive oscillation a rubber bumper 8 is provided, which can be adjusted as to stiffness by nuts 9, and this bumper so dampens the oscillations as to take out the pendulum motion which the spindle might otherwise engage in. This ball seat 7 is seen to be mounted in a heavy head casting or bracket 10, see Fig. 2, and this head casting 10, which is the real supporting member from which the entire weight of the spindle, basket, etc. is oscillatively suspended, is rigidly and securely fastened to some suitable overhead structure not shown in the drawings as it is a portion of the building. The foregoing parts of the apparatus however, including the supporting head 10, the bearings between spindles 1 and 6, the mode of oscillatively mounting the spindle on ball seat 7, with rubber bumper 8, etc., are all old, and are therefore not described in further detail herein, as their construction and relationship to each other is thoroughly understood by those familiar with centrifugal apparatus in use today.

Formerly however, the brake used for bringing the centrifugal to rest was mounted in the space generally designated by reference numeral 11, Fig. 2, on the inside of the driving pulley 4, and this brake operated on the inner surface 12 of the pulley. As previously indicated this arrangement generated the brake heat in the pulley rim at the immediate place where the belt 5 runs on the pulley, and owing to the very high temperature to which the repeated applications of the internal pulley brake raised the pulley rim, the scorching and burning of belt 5 tends to be excessive. As noted from Fig. 2, I have completely removed this internal pulley brake from space 11, Fig. 2, and have installed my new full floating, external, heat insulated brake instead.

This consists essentially of a separate brake drum 13 detachably fastened to the bottom of the pulley by bolts 14, with heat insulating washers 15 made of porous asbestos or some other good insulating material, interposed between the pulley and the new brake drum for the purpose of preventing the flow of heat from this brake drum 13 up to the pulley rim where the belt is located. It will be noticed, particularly in connection with Figures 1 and 2, that the brake drum is provided with bosses rising from its upper surface in the immediate locality of the heat insulating washers 15, and the diameter of these bosses is approximately the same as the diameter of the washers. This arrangement of the bosses, either with or without the washers 15, has the effect of providing air gaps between the brake drum and the pulley in such manner as to permit air to flow radially through said air gaps between the pulley and brake drum to keep same cool. In new centrifugals these air gaps between the brake drum and the pulley drum can be arranged in many different ways; and I would also like to point out that even in the old existing belt driven centrifugals, if the insulating washers 15 are omitted, the bosses,—which will then be bolted in direct contact with the pulley,—will still give considerable heat insulating value, particularly in view of the air gaps between and around the bosses. In this arrangement, since the term heat-insulating is somewhat relative anyway, nothing being an absolute insulator, the above described bosses may be considered as the provision for heat insulating the brake drum from the pulleys.

On its inner surface the drum 13 has a series of vanes 16 preferably cast integrally therewith, and inclined longitudinally as indicated in Fig. 2. These vanes practically make a fan blower out of brake drum 13, and by circulating large volumes of air through the brake drum assist in rapidly dissipating the brake heat and keeping the brake drum cool. In addition to creating this windage these vanes 16 also greatly increase the radiating surface of the drum, and also greatly stiffen the drum structure as the vanes function like supporting webs on the inside of the brake. This feature of inclined vanes on the brake drum is useful in centrifugal brakes generally irrespective of whether same is used on centrifugals that are belt driven, electrically driven, or driven in other ways.

Also, these inclined vanes can be arranged not only on the inside of the brake drum, which is the arrangement for external brakes, but also on the outside of the drum, which is the arrangement for internal brakes. In all these cases, the inclined vanes are useful in increasing the fanning and circulating effect on the air, also in increasing the radiating surface of the brake drum, and also in greatly stiffening the structure of the brake drum. In view of the increased cooling derived from the inclined vanes, the entire efficiency of the brake is increased because a cool brake always stops a machine quicker than a hot one, and also because the brake lining always lasts longer if its working conditions are kept cool.

Figure 4:
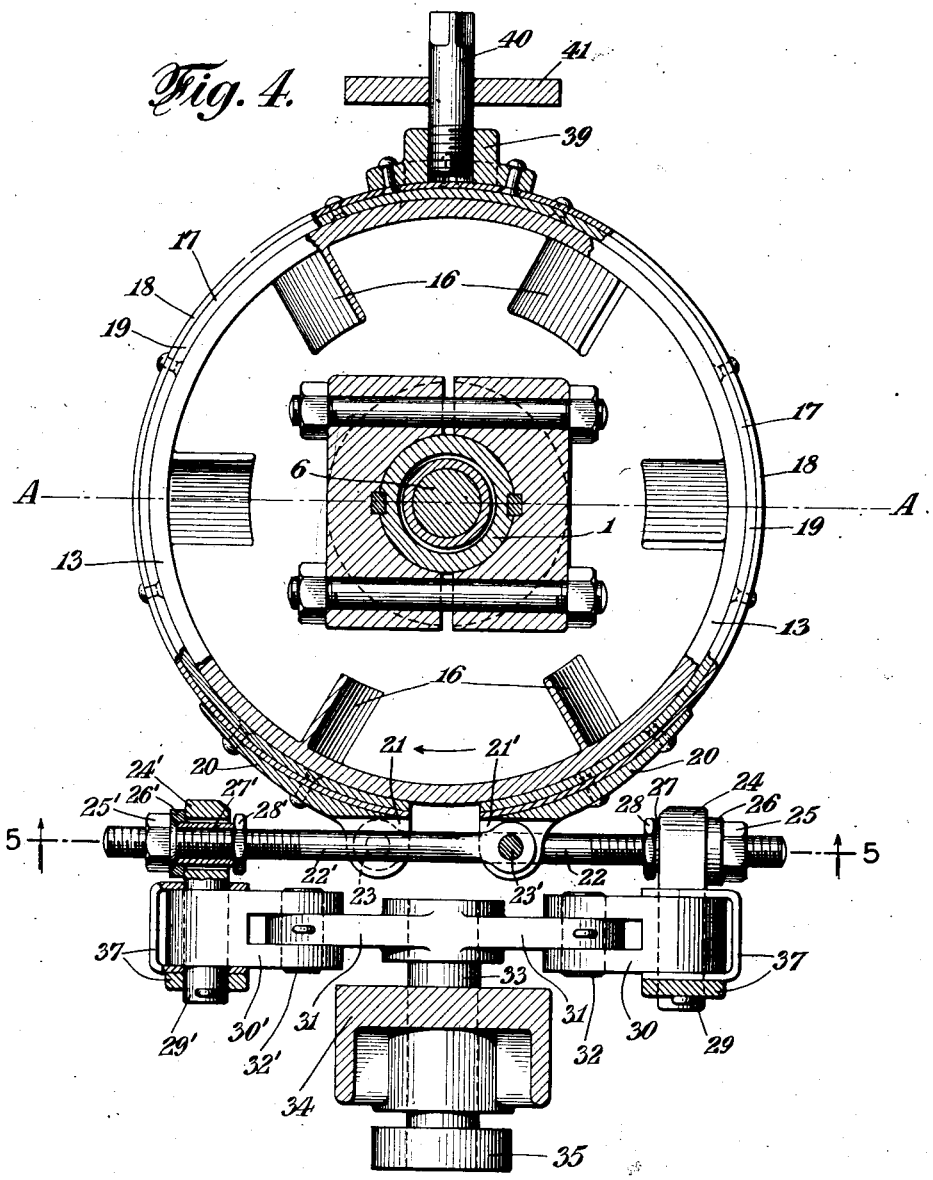
Fig. 4 is a plan section of my brake taken on line $X^4$—$X^4$ of Fig. 3.

The brake band 17, Figs. 2 and 4, comprising a flexible steel band 18 with a good grade of brake lining 19 riveted to it in the usual manner, surrounds the brake drum 13.

Figure 5:
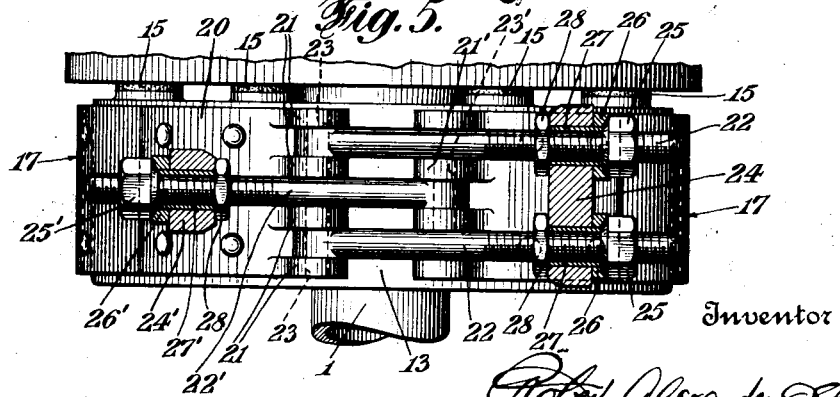
Fig. 5 is a partial view of my brake band links taken on line $X^5$—$X^5$ of Fig. 4.

This brake band has a maximum arc of contact with the brake drum. As seen in Fig. 4 the band almost completely surrounds the brake drum, only enough space remaining between the ends of the band to permit adjustment and tightening as the brake lining wears. The construction by which this maximum arc of contact is obtained is as follows:

The band has suitable heads 20 fastened to its ends, and these heads have hinge-like extremities respectively designated as 21 and 21′, see Figs. 4 and 5. These hinge-like extremities are slotted transversely as shown in Fig. 5, so that the brake links 22 and 22′ can be interlocked crosswise of these heads and substantially in the same straight line as indicated in Figs. 4 and 5. The two links 22 are pivotly connected to head 20 by pins 23, and the one link 22′ is pivotly connected to the other head by pin 23′. This pivotal connection between the links and heads permits the links to swing around freely in a horizontal plane so that they can be swung out of the way to permit the entire brake band to be slipped off and over the spindle by merely springing the extremities 21 and 21′ of the brake band apart slightly and then drawing the brake band crosswise off the spindle. Also, by fastening the links respectively to one head and allowing them to have slidable engagement through the slots in the other head, causes these links to mutually support the two ends of the brake band and retain them in the same plane so that neither end can sag downward. This effectively maintains the shape of the band and permits it to nicely and squarely engage the brake drum with uniform contact all over while closing. In closing the brake it is obvious that the two links 22, Figs. 4 and 5, are drawn to the right, and the one link 22′ is drawn to the left, and on opening the brake this movement is reversed. My purpose in using two links 22 to draw the brake band extremity 21 to the right in closing, while only one link 22′ is used to draw the extremity 21′ to the left, is because the brake drum 13, when looking down upon it from above as in Fig. 4, always turns clockwise as indicated by the arrow in Fig. 4, and therefore the entire strain of braking comes on the brake band extremity 21, which is therefore supported by two links 22, whereas the only strain on brake band extremity 21′, is that required for tightening the brake on the loose end to create the friction, and this strain being much lighter than the braking strain, only one link 22′ is used for sustaining it.

Figure 3:
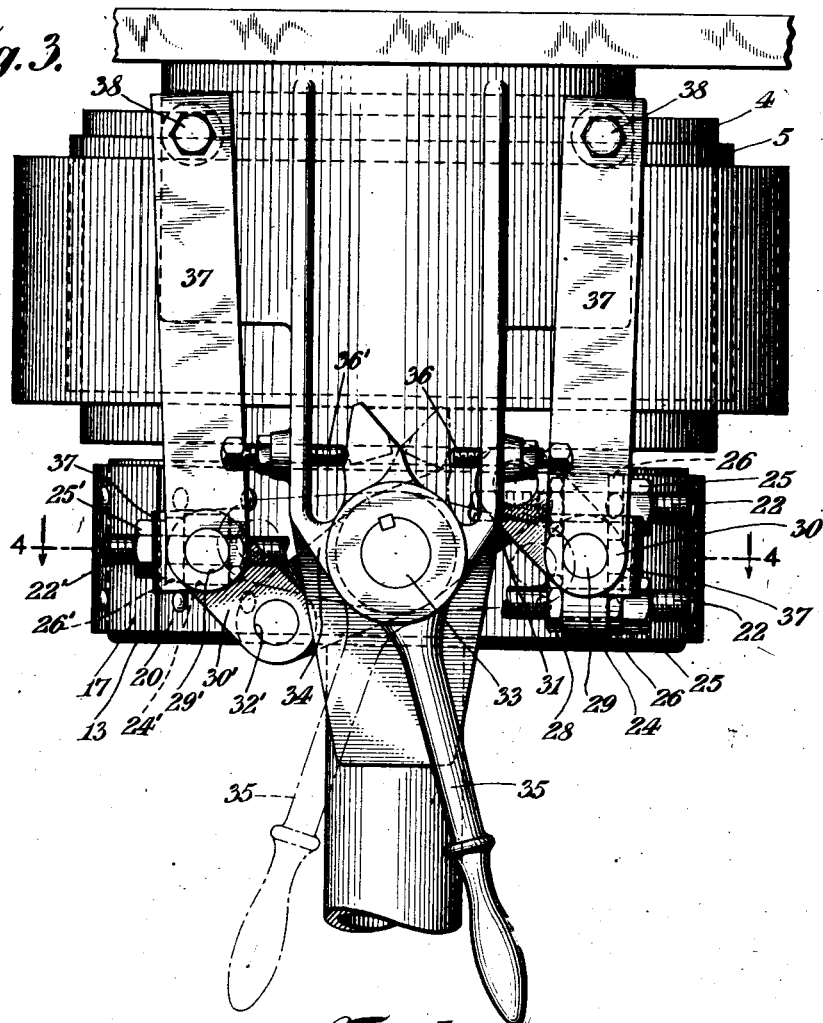
Fig. 3 is an assembly view looking at my brake from the front.

The outer extremities of the brake band links 22 and 22′ are threaded, and are connected respectively to cross-heads 24 and 24′, Figs. 4 and 5 by means of nuts 25 and 25′, washers 26 and 26′, tubular spacers and thread protectors 27 and 27′, and check nuts 28 and 28′. The stem portions 29 and 29′ of these cross heads are machined cylindrically, as indicated in Figs. 3 and 4, and these stem portions are carried by the exterior toggle links 30 and 30′, which in turn are connected to the main toggle link 31 by means of toggle pins 32 and 32′. This main toggle link 31 is in turn carried on the main toggle pin 33 which has a good bearing support in the main brake casting or bracket 34, see Figs. 2, 3 and 4. An operating lever 35, carried on pin 33, is provided for opening and closing the brake.

In Fig. 3 the brake is shown in its open position, but when the lower handle portion of the operating lever 35 is swung to the left, the toggle links push the crossheads 29 and 29′ outward and away from each other to close the brake. The toggle links are turned to a point just slightly beyond their dead center, which point is predetermined by the adjustment of set screw 36, Fig. 3, and in this position the toggle arrangement is self-locking, so that after the operator turns the lever 35 into this closed position, the brake remains tightly set without his holding the lever closed. This extended position of the toggle links, and of the crosshead stems 29 and 29′ are drawn in lightly on Fig. 3, in dot and dash lines, and indicates same in their self locking position just slightly beyond their dead center. The set screw 36′ is used to limit the throw of the operating lever 35 when opening the brake. To support the crosshead stems 29 and 29′, and to keep them from falling down, the carrier links 37 are provided, and these engage the crosshead stems at their lower extremity as indicated in Fig. 4, and are themselves supported at their upper extremities by cap screws 38 which are threaded into the main brake casting or bracket 34, see Figs. 1, 2 and 3. The lower ends of these carrier links 37 swing toward or away from each other according as to whether the brake is swung into open or closed position.

At the rear side of the brake, the brake band is supported and kept from falling down, by a member 39 fastened to it, see Figs. 2 and 4, and having a pin 40 which passes slidably through a hole in the bottom of the rear brake band support 41 which at its upper end is firmly riveted to the main head casting or centrifugal bracket 10.

The main brake casting or bracket 34 is also firmly riveted to the main centrifugal head 10 as indicated in several of the figures, particularly Fig. 2, and the rivets employed for this purpose, as well as those for fastening the rear brake band support 41 to head 10, are countersunk and are flush top and bottom so as not to interfere with fastening the head 10 to its support on top, and so as not to interfere with the upper extremity of the pulley rim, on the bottom.

One of the features of my brake is that it is full-floating, by which I mean that the brake band though held against turning so as to efficiently perform its braking action when closed, nevertheless possesses a sufficient amount of float or flexibility to permit and to yield with the oscillation of the spindle 1 on the ball seat 7 without setting up excessive strains within the brake by unnecessarily resisting these oscillations. This float or flexibility is the result of the following relationships, only some of which are really necessary, although all of them will be described together. Referring to Fig. 4 it is seen that the main toggle pin 33 has sufficient clearance inside and outside of the main brake bracket 34 so that this pin, with its toggle links, crossheads, etc. can move in and out toward the center of the spindle. Furthermore, where the tubular spacers 27 and 27' pass through their respective crossheads, the holes in the latter are elongated horizontally, although these holes vertically just accommodate these spacers nicely. Also the pivotal connection at pins 23 and 23' between the brake links 22 and 22', and the heads 20 on the brake band, permit the ends of the brake bands, 21 and 21', to freely float or swing in and out toward the center of the spindle to accommodate the oscillations of the latter and of the brake drum 13, without crowding or in any wise straining the various brake members mentioned. Similarly at the rear side of the brake, by having the pin 40 free to slide through the hole in the hanger 41, this rear side of the brake band is also free to float in and out toward the center of the spindle, to accommodate the oscillations mentioned.

In the other direction however, i. e., along the center line A—A Fig. 4, the arrangement of the parts is such that the float of the brake band is much less, and is limited almost entirely to the flexibility in the steel band 18, but this increased rigidity in this direction is desirable because sometimes when the spindle runs wild and oscillates or gyrates too widely because of a greatly unbalanced load in the basket, it is necessary to throw on the brake, which, because of its relative stiffness in direction A—A quickly steadies the spindle and reduces the amplitude of the spindle gyrations to a normal amount, at the same time bringing the spindle to rest, and while controlling and dampening such a bucking spindle none of the toggle links, brake links, or other connections at the front or rear side of the brake will be sprung or damaged by the violent oscillations because of the above described full-floating character of all the parts in this direction.

Figure 6:
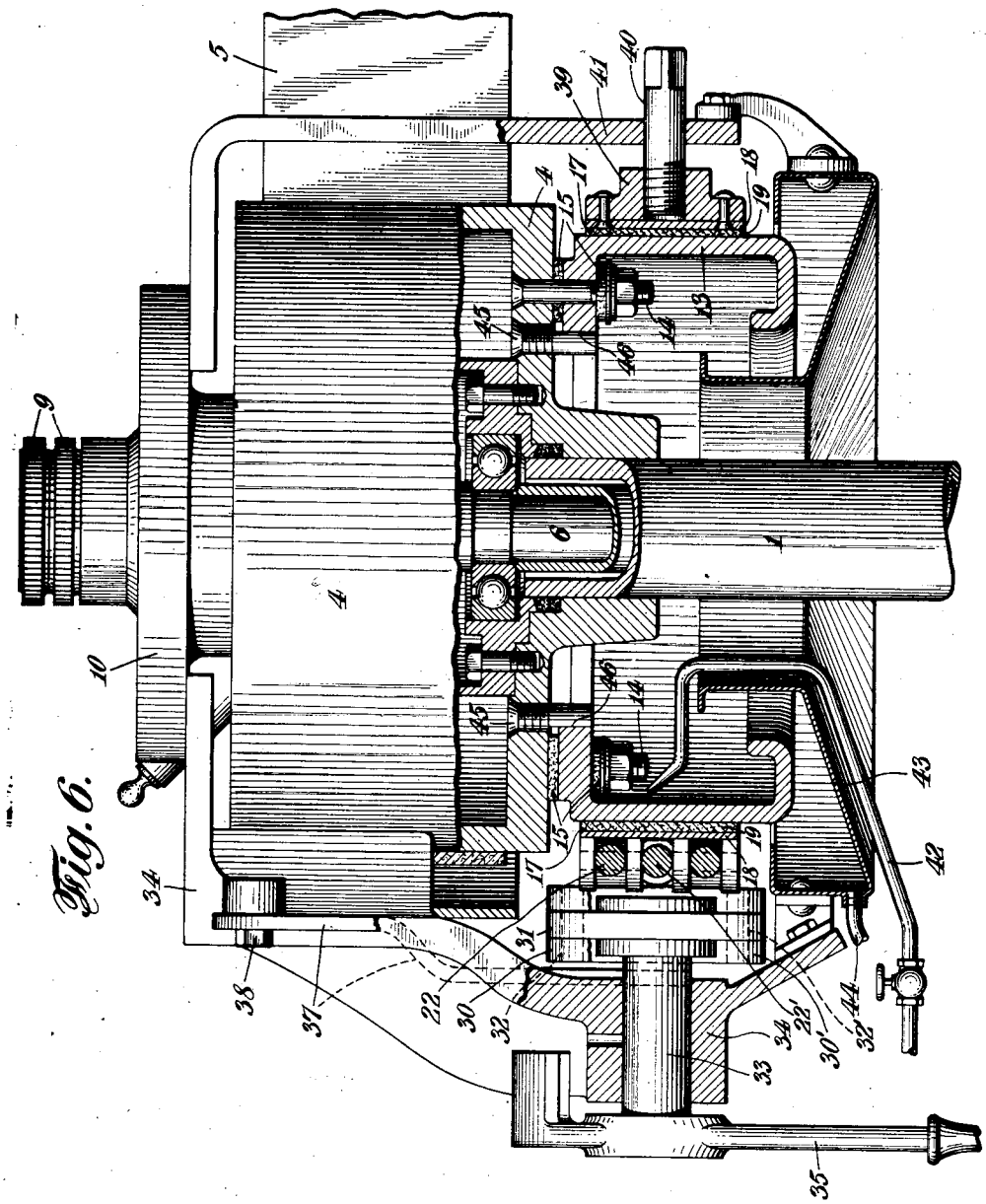
Fig. 6 is an elevation, partly in section, showing a modified form of my brake.

Fig. 6 illustrates one possible modification of my brake, and indicates how the brake drum 13 may be cooled by water, instead of air cooling as above described. In this view the brake drum 13 is suitably shaped to adapt it to water cooling. Also some suitable means for applying the water is used such as pipe 42, the upper extremity of which is arranged to direct the water on to the inner surface of drum 13 and preferably toward its upper extremity. A hood 43 of suitable shape, and having a drain 44, is also provided for catching the cooling water after it leaves drum 13.

Whether the drum 13 is water cooled or air cooled, I have found it desirable to make special provision for accurately centering this drum with reference to spindle 1 and pulley 4, and this I accomplish by providing the centering studs 45, Figs. 2 and 6, fastened into the pulley, and having their lower outer extremities 46 accurately turned on a true circle concentric with the center of the spindle and pulley. The inner turned surface of the brake drum just slips over the bottom turned surfaces of the centering studs 45, which insures perfect alignment between the outer turned surface of the brake drum 13 and the center of the spindle.

From the foregoing detailed description it is thought that the construction and operation of my external heat insulated brake will be apparent.

To set the brake it is merely necessary for the operator to throw the operating handle 35 to the left, see Fig. 3, till this lever butts against set screw 36, in which position the brake has locked itself, and will hold itself set, because of the toggle links having passed just beyond their dead centers, as previously described. To release the brake, the operator need merely throw lever 35 in the opposite direction.

When it is desired to remove brake band 17 for the purpose of relining same, it is merely necessary to remove the threaded pin 40 at the rear, by unscrewing from member 39, and also to take off the nuts 25 and 25' by unscrewing from the brake band links 22 and 22'. By then throwing the toggle links into their extended position, where the crossheads 24 and 24' are spread apart from each other by the largest possible amount, the brake band links 22 and 22' can be manipulated to draw them out of their respective crossheads, thereby detaching them therefrom, and the entire brake band can then be removed by stripping off the spindle. This mode of removing and replacing the brake band, and also subsequently adjusting it by adjusting nuts 25 and 25' to compensate for wear of the brake lining, is very much simpler and easier than with the previous internal pulley brake. This increased accessibility of my brake, together with various other advantages and benefits which it has, are greatly appreciated by those who operate the same.

By causing both extremities of the brake band to move under the action of the toggles, I obtain maximum arc of contact between the brake band and drum, and also obtain maximum movement of the brake band in opening and closing, which insures good tight contact when closed, and ample clearance when open, so the brake does not drag.

Since the centrifugal station where these machines are arranged and operated, is very crowded with other parts and attachments such as dischargers, filling spouts, etc., which parts need not be described or shown herein as they are thoroughly understood by those skilled in the art, some difficulty is experienced in arranging an external brake on old existing centrifugals in such manner that same does not interfere with any of the connected machinery or parts referred to. This I accomplish very nicely by locating my main brake casting or bracket 34 immediately at the front of the centrifugal and the supporting hanger 41 diametrically opposite at the immediate rear of the centrifugal. By fastening these members to the original head casting 10 in such manner as to give the parts the relationship and location just mentioned, my brake can be very easily and conveniently installed on existing centrifugal installations without in any wise interfering or conflicting with other associated parts or apparatus.

It is distinctly understood, however, that my brake, with various of its benefits and improvements, is intended for use on new centrifugals, as well as on old existing centrifugals, and when built into new centrifugals its form and construction can be considerably varied from that shown herein, as the latter only represents one form of invention, which can be changed and altered considerably without departing from the basic conception of my invention and improvements.

So far as I am aware I am first and original in arranging these overhead belt-driven centrifugals with a separate brake drum spaced apart or heat insulated from the belt pulley for the purpose of most effectively preventing the heating or scorching of the belts by the brake heat, and also of cooling these separate brake drums by some distinct cooling means such as air or water cooling, and I therefore desire to protect these and other features of my invention broadly.

Claims:
1. In combination a revolvable vertical basket-carrying spindle, a driving pulley attached to said spindle, a separate brake drum securely fastened to said pulley, and means for heat-insulating said brake drum from said pulley, said means comprising heat-insulating material interposed between said pulley and said brake drum.

2. In combination a revolvable vertical basket-carrying spindle, means for oscillatively supporting said spindle, a driving pulley rigidly fastened to said spindle, a brake drum having an air gap between the brake drum and pulley permitting air to flow radially through said air gap between the pulley drum and brake drum to cool same, also an external brake member with brake material thereon adapted to engage the outer surface of said brake drum, and means for engaging and disengaging said brake member with said brake drum.

3. In combination a revolvable vertical basket-carrying spindle, means for oscillatively supporting said spindle, a driving pulley rigidly fastened to said spindle, a brake drum, an external brake band with brake material thereon surrounding said brake drum, and toggle means for opening and closing said brake band, said toggle means comprising a revolvable pin securely mounted in a horizontal bearing the projected center of which passes approximately through the center of the vertical basket-carrying spindle, a double toggle lever rigidly fastened to said pin and projecting in opposite directions away from said pin, toggle links pivotally connected to each end of said double toggle lever, means for supporting and guiding said toggle links, and adjustable means for connecting each of said toggle links with one of the ends of said brake band for opening and closing the brake.

4. In combination a revolvable vertical, basket-carrying spindle, a driving pulley attached to said spindle, a separate brake drum securely fastened to said pulley, provision for heat-insulating said brake drum from said pulley, and provision for removing from said drum the heat generated during braking.

5. In combination, a revolvable, vertical, basket-carrying spindle, means for oscillatively supporting the same, a brake drum thereon the axis of the cylindrical braking surface of which is vertical and concentrically aligned with the axis of said spindle, a brake with brake material thereon adapted to engage the braking surface of said brake drum, and provision for aiding in removing the heat from said brake drum and for strengthening said drum, said provision consisting of inclined vanes forming a part of said brake drum and projecting integrally from the cylindrical part thereof and being disposed at an angle or spiral with reference to the vertical axis of said drum to strengthen said drum and give better air circulation for more effectively cooling it.

In testimony whereof I have hereunto set my hand at Washington, in the District of Columbia, this 7th day of May, 1926.

ROBERT ALEXANDER STEPS.